Nov. 12, 1968   D. H. REDMAN   3,411,056
OXYGEN JET CUTTING MACHINE FOR SIMULTANEOUSLY MAKING TWO CUTS
Filed Sept. 29, 1964   2 Sheets-Sheet 1
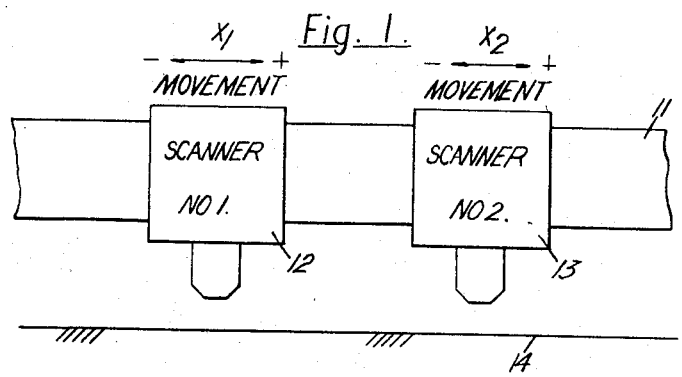
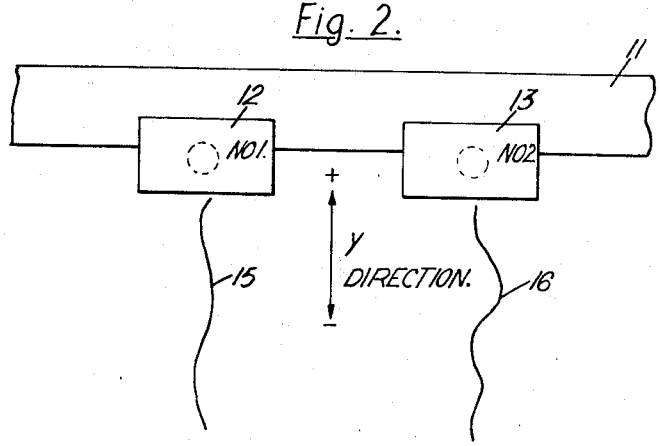
Inventor
DEREK H. REDMAN
By [signature]
Attorneys 3,411,056
OXYGEN JET CUTTING MACHINE FOR SIMULTANEOUSLY MAKING TWO CUTS
Derek Harry Redman, Croydon, Surrey, England, assignor to Hancock & Co. (Engineers) Limited, Croydon, Surrey, England, a British company
Filed Sept. 29, 1964, Ser. No. 400,146
Claims priority, application Great Britain, July 20, 1964, 29,477/64
3 Claims. (Cl. 318—18)

ABSTRACT OF THE DISCLOSURE

An oxygen jet cutting machine for simultaneously making two cuts using two photoelectric line follower heads mounted for independent transverse movement on a beam, each line follower controlling one cutting burner, the beam being moved longitudinally of the machine at a speed proportional at any instant to the mean of the two longitudinal movement signals derived from the follower heads.

---

This invention relates generally to oxygen jet cutting machines having photoelectric line followers, and more particularly to a control system by which two oxygen jet cutters may be used simultaneously to make cuts according to two dissimiliar outlines.

The automatic cutting of shapes according to an outline in an oxygen jet cutting machine is a well known process and is normally carried out by causing a photoelectric follower to follow an outline on a substrate such as a sheet of paper, and causing an oxygen jet cutter to follow the same path over a workpiece, which is normally a sheet of steel. One kind of machine used for this purpose comprises a beam or table which is placed transverse to the longitudinal direction of the machine and is movable in the longitudinal direction. The beam carries an upper carriage which supports both a follower and the flame cutter which are movable along the beam or table. In an alternative type of installation the following device is arranged as a separate small tracing machine, the movements of the beam and cutter in the main machine being controlled by the movements of the follower over the outline in the tracing machine.

At times it may be necessary to cut workpieces which have opposite edges which are to have different shapes, and in such cases it is convenient to be able to cut both edges at once.

It is already known to cut two dissimilar edges by the use of two separate followers and cutters which are independently traversed along the beam for transverse movement, the beam with both the cutters being moved in the longitudinal direction of the machine at a speed which is controlled by one of the followers.

In the following description the movements of the followers transverse to the length of the machine will be referred to as movements in the X direction and movements in the longitudinal direction of the machine will be referred to as movements in the Y direction.

The machines are arranged so that the movement of the follower and tool is substantially at constant speed, whatever its direction, so that the cutter is allowed sufficient time to do its work irrespective of its direction of travel.

The method, described above, of cutting two edges simultaneously has the disadvantage in that if the follower which controls the movement of the beam in the Y direction happens to be following a portion of its outline which lies substantially in the Y direction the beam will be moving at maximum speed in the Y direction, but if the second follower at the same time reaches a portion of its outline which is steeply inclined to the Y direction it will have to make a very rapid movement in the X direction, and this may be too rapid for the cutter to be able to cut the workpiece. If, on the other hand, the movement in the Y direction is slowed down in order to allow for this condition, then if the reverse condition occurs, that is, the follower which is controlling the beam movement in the Y direction reaches a part of its outline which is steeply inclined to the Y direction, the movement of the other cutter in the X direction will be extremely slow. Accordingly the total time required for the operation may be unduly high.

The object of the invention is to provide an oxygen flame cutting machine having two follower heads for simultaneously following two outlines, two cutting heads for simultaneously cutting two shapes corresponding respectively to the two outlines, and means to drive the beam carrying the cutting heads at a speed which is the mean of the speeds at which the two follower heads would drive it if acting independently.

The invention consists of an oxygen jet cutting machine simultaneously making two cuts along a workpiece respectively in accordance with separate outlines marked on a substrate comprising a beam disposed transversely of the machine, a longitudinal drive motor to drive the beam in the longitudinal direction of the machine, two follower heads carried on the beam each producing a steering signal for respectively following the two outlines, a follower motor in each follower head, circuitry associated with each follower head to cause the respective follower motor to drive the follower head to make independent transverse movements along the beam in response to steering signals produced by the follower head as it follows the respective outline, electrical means associated with each follower head to produce a longitudinal movement signal, and longitudinal drive circuitry to derive a signal which is the mean of the two longitudinal movement signals for application to the longitudinal drive motor.

One example of an arrangement according to the invention will now be described, with reference to the accompanying drawings, in which—

FIGURE 1 shows diagrammatically two follower heads mounted on a cross beam which is adapted for movement in the longitudinal direction of the cutting machine;

FIGURE 2 is a diagrammatic plan view of the beam and follower heads;

Figure 3:
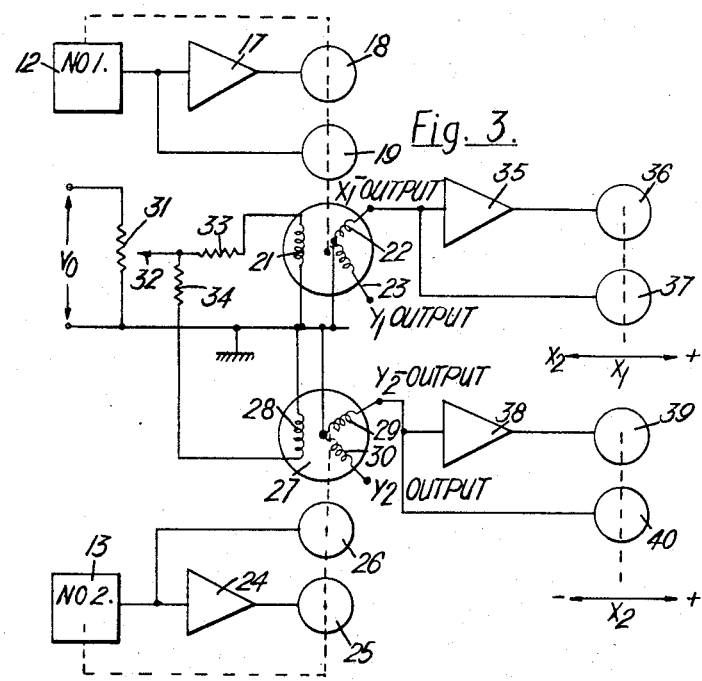
FIGURE 3 is a circuit diagram showing how the separate movements of the two follower heads in the X direction are obtained.

Referring to FIGURE 1, an oxygen jet cutting machine comprises a beam 11 carrying two follower heads, respectively 12 and 13, and respectively marked "Scanner No. 1" and "Scanner No. 2." The beam 11 is mounted on wheels and spands the width of the cutting machine, and the wheels are arranged to enable the beam to traverse the machine in the longitudinal direction of the machine which is referred to as the Y direction. The follower 12 is movable along the beam 11 and its direction will be referred to as the $X_1$ movement while the follower 13 is similarly movable along the beam 11 and its direction will be referred to as the $X_2$ movement. This is merely to distinguish between the two followers which, in fact, move in precisely the same direction. The beam 11 is mounted above a surface 14 upon which a substrate containing an outline, such as a sheet of white paper having an outline drawn upon it, may be laid.

FIGURE 2 shows the beam 11 and the two followers 12 and 13 in plan view. It also shows two outlines, respectively 15 and 16, which are being followed respectively by the followers marked Scanner No. 1 and Scanner No. 2.

FIGURE 3 shows a preferred form of circuitry for securing the $X_1$ and $X_2$ movements of the respective followers. The follower 12 provides the usual steering signals which are fed to the input of an amplifier 17, the output of which is used to drive a motor 18. The motor 18 is coupled to the follower 12 and is able to rotate or steer it in either direction. The shaft of the motor 18 drives a tachogenerator 19, whose output is connected to the input of the amplifier 17 in opposition to the signals from the follower 12. The tachogenerator 19 provides a velocity damping signal to prevent "hunting" on the part of the motor, according to known principles.

The motor 18 also drives the rotor of a synchro or magslip resolver 20 which has a fixed winding 21 and a pair of windings 22 and 23 which are mutally at right angles. The operation of the synchro resolver is well known, the winding 21 setting up a field along a particular axis which crosses the rotational axis of the rotor and it induces voltages in the windings 22 and 23 whose magnitude is dependent upon the rotational position of the rotor. It will be understood that a sine/cosine potentiometer could be used in place of the resolver.

The follower 13 is connected to an amplifier 24, similar to the amplifier 17, and the amplifier 24 drives a motor 25 coupled to a tachogenerator 26 and also coupled to a resolver 27 having windings 28, 29 and 30, all precisely as described in connection with the follower 12, and for the same purpose.

A potentiometer 31 is connected across an alternating current supply and by means of its slider 32 a desired voltage may be applied to the energizing windings 21 and 28 of the two resolvers. The winding 21 is fed through a resistor 33 and the winding 28 is fed through a resistor 34, the resistors 33 and 34 being of equal value. Consequently the excitation of the two resolvers is identical. The winding 22 of the first resolver marked "$X_1$ output" is applied to an amplifier 35 which drives a motor 36, and the motor 36 drives the follower 12 to and fro along the beam 11 to provide the $X_1$ movement. The motor 36 is also coupled to a tachogenerator 37, which provides a velocity damping signal which is fed to the input of the amplifier 35 in opposition to the $X_1$ output signal.

In a corresponding manner the $X_2$ output from the resolver 27 is fed to an amplifier 38 which feeds a motor 39 to traverse the follower 13 to and fro along the beam 11 to provide the $X_2$ movement, and the motor 39 also drives a tachogenerator 40 whose output is fed to the input of the amplifier 38 in opposition to the $X_2$ output.

Figure 4:
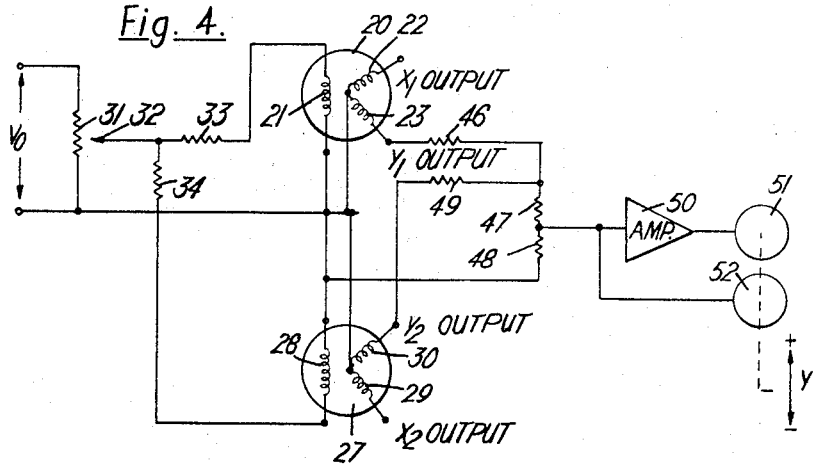
FIGURE 4 is a circuit diagram showing how the movement of the beam carrying the follower heads is obtained at the mean of the velocity at which the individual followers would drive it.

The manner in which the movement in the Y direction is derived is shown in the circuit of FIGURE 4, which is really a part of the circuit of FIGURE 3 but has been separated in the drawings for clarity in description. As shown, in FIGURE 3, the potentiometer 31 has a voltage $V_0$ applied to it and the voltage tapped off by the slider 32 is applied through a resistor 33 to the winding 21 of the resolver 20, and the same voltage is applied through the resistor 34 to the winding 28 of the resolver 27. FIGURE 3 shows the connections for the $X_1$ and $X_2$ outputs and how these are applied to control the two followers 11 and 12. FIGURE 4, on the other hand, shows the connections of the $Y_1$ and $Y_2$ outputs obtained from the windings 23 and 30.

The $Y_1$ output is connected through a resistor 46 to two resistors, respectively 47 and 48, connected in series and forming a voltage divider. The $Y_2$ output is connected through a resistor 49 to the same two resistors 47 and 48, the value of the resistors 46 and 49 being equal and very much greater than the values of the resistors 47 and 48, which are also equal. The voltage at the tapping point of resistors 47 and 48 is fed to an amplifier 50 which feeds a motor 51 connected to drive the beam 11 in the Y direction. The motor 51 is coupled to a tachogenerator 52 whose output is connected to the input of amplifier 50 in opposition to the signal from the resistors 47 and 48.

In operation the $X_1$ and $X_2$ control of the followers 12 and 13 is normal and as described above. The $Y_1$ and $Y_2$ outputs are, however, summed by the resistors 47 and 48 so that the output at their junction is proportional to the mean of the $Y_1$ and $Y_2$ outputs. Accordingly, the speed of traverse of the beam 11 along the length of the machine, that is, in the Y direction, is the mean of the two different speeds at which it would be driven if it were under the control either of the follower 12 or of the follower 13. Thus, if both the outlines happen to be in a direction which approximates to the Y direction the speed of the beam in the Y direction will be at its highest. On the other hand, if either one of the outlines follows a direction which makes a large angle with the Y direction then the speed of the beam in the Y direction is automatically reduced.

I claim:

1. An oxygen jet cutting machine for simultaneously making two cuts along a workpiece respectively in accordance with separate outlines marked on a substrate comprising a beam disposed transversely of the machine, a longitudinal drive motor to drive the beam in the longitudinal direction of the machine, two follower heads carried on the beam each producing a steering signal for respectively following the two outlines, a follower motor in each follower head, circuitry means associated with each follower head to cause the respective follower motor to drive the follower head to make independent transverse movements along the beam in response to steering signals produced by the follower head as it follows the respective outline, electrical means associated with each follower head to produce a longitudinal movement signal, and longitudinal drive circuitry means to derive a signal which is the mean of the two longitudinal movement signals for application to the longitudinal drive motor.

2. A machine as claimed in claim 1 in which the means to produce the independent transverse movement of each follower head comprises an amplifier fed with the steering signals from the follower head, a steering motor energized by the amplifier output, the steering motor being coupled to the follower head to steer it, a synchro resolver coupled to the steering motor, a second amplifier to which one output of the resolver is connected, the output of the second amplifier being connected to drive the follower motor; and the means to move the beam longitudinally comprises a resistance network connected to the other output of each resolver whereby the two other outputs are summed, another amplifier to which at least a part of the summed output is applied, the output of the said another amplifier being applied to drive the longitudinal drive motor, and a tachogenerator driven by the longitudinal drive motor having its output connected to oppose the input signal of the said another amplifier.

3. In an oxygen jet cutting machine of the type having a substrate presenting a pair of longitudinal outlines having dissimilar lateral deviations, a pair of cutters for simultaneously making separate cuts according to the dissimilar outlines, a follower for each cutter, common support means for said followers for movement of the followers in said longitudinal direction at a common speed, means mounting said followers on said common support means for independent transverse movement, longitudinal drive means for moving said common support at said common speed, transverse drive means for each follower, and means for controlling said transverse drive means to cause said followers to follow their respective outlines as said common support is moved longitudinally over said substrate, the improvement comprising:
    first means associated with one follower having a signal output proportional to the absolute speed of said one follower due to the combined effects of its longitudinal and transverse movements,
    second means associated with the other follower having a signal output proportional to the absolute speed of said other follower due to the combined effect of its longitudinal and transverse movements, and means controlling said longitudinal drive means in accord with the mean of said output signals to vary said common speed.

References Cited

UNITED STATES PATENTS

| | | | |
|---|---|---|---|
| 2,862,661 | 12/1958 | Goldman | 318—28 XR |
| 2,900,586 | 8/1959 | Spencer et al. | 318—28 XR |
| 2,927,735 | 3/1960 | Scuitto | 318—162 XR |
| 3,188,541 | 6/1965 | Eisengrein et al. | 318—28 |

BENJAMIN DOBECK, *Primary Examiner.*